United States Patent
Nakatsuka

(10) Patent No.: US 9,297,698 B2
(45) Date of Patent: Mar. 29, 2016

(54) COLORIMETRIC METHOD, COLORIMETRIC APPARATUS, AND PRINTING APPARATUS

(71) Applicant: SEIKO EPSON CORPORATION, Tokyo (JP)

(72) Inventor: Tsubasa Nakatsuka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/614,876

(22) Filed: Feb. 5, 2015

(65) Prior Publication Data

US 2015/0233764 A1    Aug. 20, 2015

(30) Foreign Application Priority Data

Feb. 19, 2014  (JP) .................................. 2014-029285

(51) Int. Cl.
*H04N 1/46*       (2006.01)
*G01J 3/52*       (2006.01)
*H04N 1/56*       (2006.01)

(52) U.S. Cl.
CPC .... *G01J 3/52* (2013.01); *H04N 1/56* (2013.01)

(58) Field of Classification Search
None
See application file for complete search history.

(56) References Cited

U.S. PATENT DOCUMENTS

| | | | | |
|---|---|---|---|---|
| 5,701,175 | A  * | 12/1997 | Kostizak et al. | 356/326 |
| 7,233,398 | B2 * | 6/2007  | Kitazawa  | 356/402 |
| 7,307,752 | B1 * | 12/2007 | Mestha  | H04N 1/4078 358/1.9 |
| 7,633,646 | B2 * | 12/2009 | Ichitani  | 358/1.9 |
| 8,325,393 | B2 * | 12/2012 | Yamamoto  | 358/505 |
| 8,498,029 | B2 * | 7/2013  | Yamamoto  | 358/505 |
| 8,537,441 | B2 * | 9/2013  | Namikata  | 358/518 |
| 8,797,589 | B2 * | 8/2014  | Dalal  | H04N 1/6033 358/1.18 |
| 2010/0086201 | A1 * | 4/2010 | Muto et al.  | 382/162 |
| 2012/0224872 | A1 * | 9/2012 | Wu  | G03G 15/0189 399/49 |
| 2013/0242320 | A1 * | 9/2013 | Suzuki et al.  | 358/1.9 |

FOREIGN PATENT DOCUMENTS

| | | | | |
|---|---|---|---|---|
| JP | 2005061926 A | * | 3/2005 | ............... G01J 3/52 |
| JP | 2006-258683 A | | 9/2006 | |

* cited by examiner

*Primary Examiner* — Dung Tran
(74) *Attorney, Agent, or Firm* — Global IP Counselors, LLP

(57) ABSTRACT

A colorimetric method includes performing colorimetry on color patches to acquire colorimetric values, and determining whether or not color patches subjected to colorimetry are color patches that should undergo colorimetry based on the colorimetric values and reference values.

7 Claims, 7 Drawing Sheets

COLORIMETRIC METHOD, COLORIMETRIC APPARATUS, AND PRINTING APPARATUS

CROSS-REFERENCE TO RELATED APPLICATIONS

This application claims priority to Japanese Patent Application No. 2014-029285 filed on Feb. 19, 2014. The entire disclosure of Japanese Patent Application No. 2014-029285 is hereby incorporated herein by reference.

BACKGROUND

1. Technical Field

The present invention relates to a colorimetric method, a colorimetric apparatus, and a printing apparatus.

2. Related Art

Japanese Unexamined Patent Application Publication No. 2006-258683 (Patent Document 1) discloses a colorimetric apparatus that measures the color values of a plurality of color patches arranged in a color chart by a manual colorimetric device provided with colorimetric sensors, wherein the colorimetric apparatus that is provided with a color chart display means that displays a chart image simulating a color chart on a user interface (UI) screen, a line scanning means that sequentially receives the colorimetry results of a manual colorimetric device for a color patch group in one column or one row and highlights the display of regions that correspond to the color patch group in the chart image, and spot scanning means that receives the colorimetry results for color patches which had abnormal colorimetric results that were received in the line scanning means and highlights the display of regions corresponding to the color patches in the chart image.

SUMMARY

When color patches undergo colorimetry, sometimes color patches that should not undergo colorimetry are subjected to colorimetry. The technology described in Patent Document 1 is unable to handle this kind of colorimetric error.

Therefore, an aspect is to provide technology that is able to handle the case in which color patches that should not undergo colorimetry are color patches that are subjected to colorimetry.

A first aspect to solve the problems described above is a colorimetric method and includes performing colorimetry on color patches to acquire colorimetric values, and determining whether or not the color patches subjected to colorimetry are color patches that should undergo colorimetry based on the colorimetric values and reference values.

Due to this, colorimetry of color patches that should not undergo colorimetry can be detected.

Here, the determining may further include determining whether or not color patches subjected to colorimetry are color patches that should undergo colorimetry based on whether or not the quadrants in the a*b* plane in L*a*b* color space to which the colorimetric values belong are the same as the quadrants in the a*b* plane in the L*a*b* color space to which the reference values belong. Due to this, the determination process of whether or not patches should undergo colorimetry can be simplified, and the load on the colorimetric apparatus can be reduced.

Here, in the colorimetric method, the color patches are arranged in a matrix form, and the colorimetric values are measured color values of a color chart arranged along the rows or the columns of the matrix. Colors belonging to the first quadrant, the third quadrant, or the fourth quadrant in the a*b* plane are assigned in a predetermined order to the color patches arranged in the rows or the columns of the matrix. The determining may further include determining a decoded value based on which of the first quadrant, the third quadrant, and the fourth quadrant in the a*b* plane a colormetric value belongs to, and determining whether or not color patches subjected to colorimetry are color patches that should undergo colorimetry based on whether or not the remainder of the number of rows or columns subjected to colorimetry relative to a numerical value 3 matches with the decoded value. From this, the determination process of whether or not patches should undergo colorimetry can be simplified, and the load on the colorimetric apparatus can be reduced.

Here, a colorimetric method arranges a plurality of color patches on a line and may also include determining whether or not the color patches subjected to colorimetry are arranged in one line based on whether or not each of the colorimetric values of the plurality of color patches is within a predetermined range with respect to the reference values. Due to this, it becomes possible to detect colorimetric errors of measuring the colors of color patches arranged on a plurality of lines regardless of whether the color patches arranged on one line should undergo colorimetry.

Here, the determining may further include determining whether or not color patches subjected to colorimetry are color patches that should undergo colorimetry based on a colorimetric value in the initial colorimetry and a reference values of a color patch. Due to this, the needless execution of operations or processes or the like can be prevented from occurring.

Here, the color patches are arranged in a matrix form. The colorimetric values may also be measured color values of the color patches arranged along the rows or the columns of the matrix. When the color patches are arranged along the columns or the rows of a matrix, the mixing rate of color patches on lines that should undergo colorimetry and color patches on lines that should not undergo colorimetry becomes high. Consequently, this kind of arrangement can better provide the desired results.

A second aspect to solve the above problems is a colorimetric apparatus that includes an acquisition unit configured to perform colorimetry on color patches to acquire colorimetric values, and a first determination unit configured to determine whether or not color patches subjected to colorimetry are color patches that should undergo colorimetry based on the colorimetric values and reference values.

A third aspect to solve the above problems is a printing apparatus includes a colorimetric apparatus including an acquisition unit configured to perform colorimetry on color patches to acquire colorimetric values, and a first determination unit configured to determines whether or not color patches subjected to colorimetry are color patches that should undergo colorimetry based on the colorimetric values and reference values.

BRIEF DESCRIPTION OF THE DRAWINGS

Referring now to the attached drawings which form a part of this original disclosure.

DETAILED DESCRIPTION OF EMBODIMENTS

An embodiment of the present invention will be explained with reference to the drawings.

Figure 1:
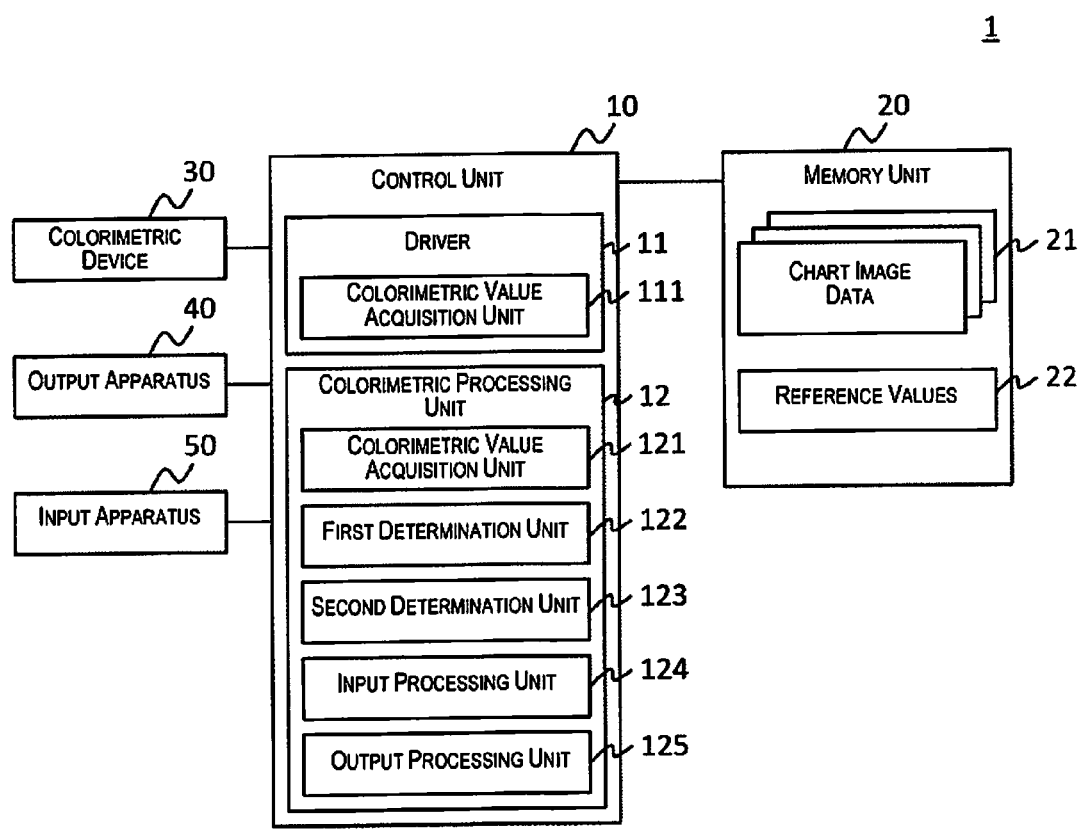
FIG. 1 is a configuration diagram of a colorimetric apparatus of the embodiments.

FIG. 1 is a configuration diagram of a colorimetric apparatus 1 of this embodiment. Colorimetric apparatus 1 includes a control unit 10 and a memory unit 20, and is implemented on a computer.

The control unit 10 is a calculation apparatus, for example, a Central Processing Unit (CPU). The memory unit 20 is an external memory apparatus, for example, a Hard Disc Drive (HDD) or a Solid State Drive (SSD), or the like. However, the memory unit 20 may be implemented from volatile memory or nonvolatile memory, which is not shown, or a portable memory media such as a Digital Versatile Disk (DVD), and a read-in apparatus for portable storage media.

In the control unit 10, a colorimetric device 30, an output apparatus 40, an input apparatus 50, and the like are connected via buses and interfaces, which are not shown. The colorimetric device 30 is known, and will be explained in this embodiment as a type of hand scanner that a user manually operates and moves. The colorimetric device 30 will be described in detail later. The output apparatus 40 is, for example, a display apparatus, a printer apparatus, or a speaker. The input apparatus 50 is, for example, a keyboard, a mouse, or a microphone.

The control unit 10 includes a driver 11, a colorimetric processing unit 12, and the like. The driver 11 is a driver that becomes the intermediary between the colorimetric device 30 and the colorimetric apparatus 1, and includes a colorimetric value acquisition unit 111. The colorimetric value acquisition unit 111 acquires colorimetric values when the color patches P in a color chart C to be described later underwent colorimetry.

Figure 2:
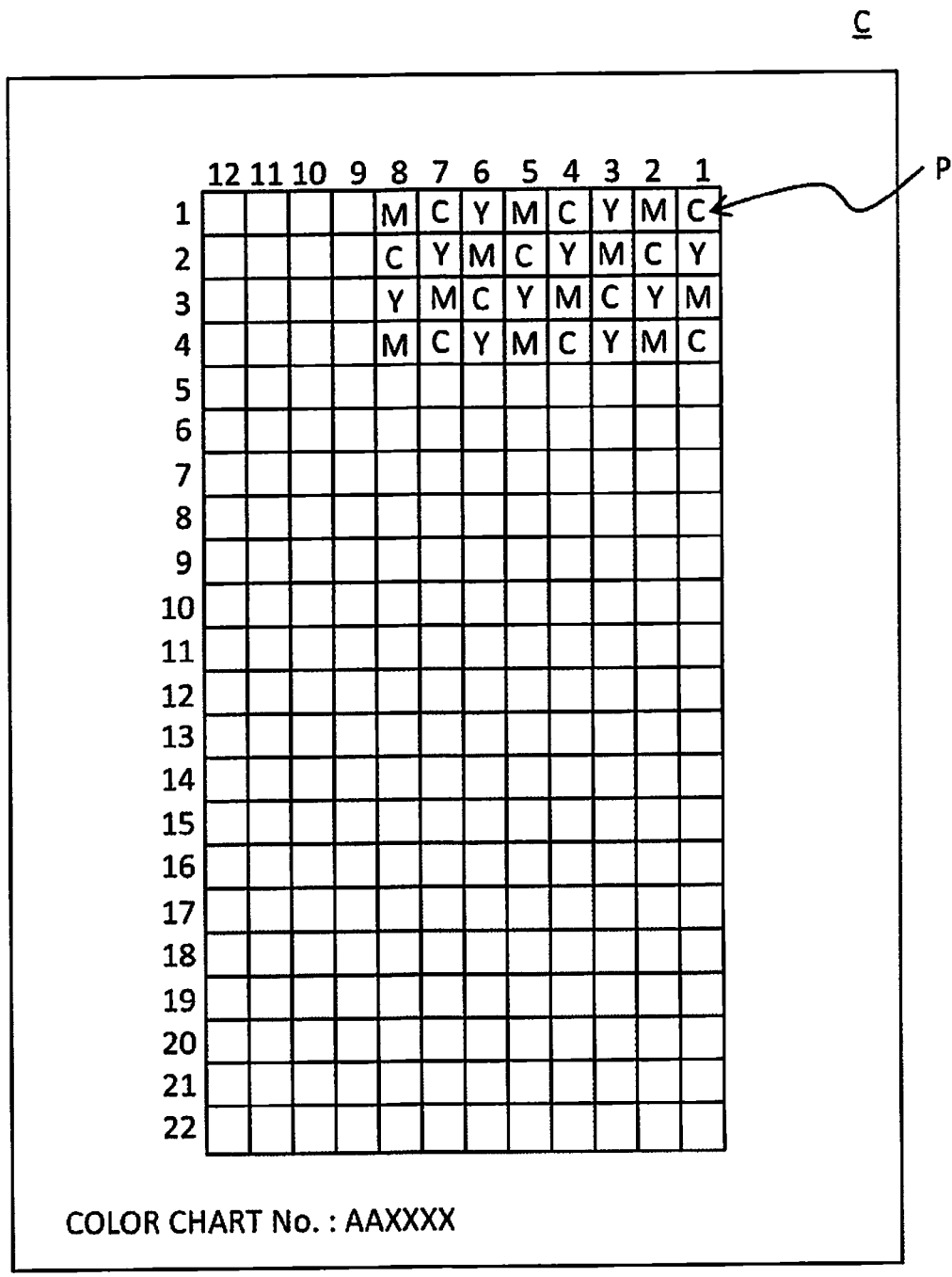
FIG. 2 is a schematic diagram of a color chart C.

Here, the color chart C to undergo colorimetry in the colorimetric apparatus 1 is explained. FIG. 2 is a schematic diagram of the color chart C. A plurality of color patches P is arranged in a matrix form on the color chart C. The color chart C shown in FIG. 2 is color patches P arranged in 22 rows by 12 columns and has a different color assigned to each color patch P. In the explanation below, the color patch P arranged at column m and row n is color patch P (m, n).

Here, a color patch P refers to a region that is assigned a color that becomes the colorimetry target. The color of a color patch P is assigned in order to become the colorimetric value of the reference value, but the extent of the color reproduction depends on the apparatus or the technologies (e.g., printing apparatus, printing media, display apparatus and related technologies thereto) related to the display realization of the color patch P.

In addition, here, color chart C refers to the inclusion of one or more color patches P. The color chart C may also comprise color patches P printed on any shape that is formed from any material (e.g., paper, resin, cloth, metal, inorganic materials such as glass or ceramic, or mixtures thereof), or may also be color patches P displayed on a display apparatus.

The color chart C explained here is color patches P printed on a sheet-like medium, but is not limited to this, as is clear from the above.

Colorimetry is performed on the color patches P in a color chart C by the colorimetric device 30. Colorimetry is the case in which only one color patch P undergoes colorimetry, and the case in which a plurality of color patches P arranged along columns or rows sequentially undergoes colorimetry. As will be explained later in detail, in this embodiment, the case in which a plurality of color patches P arranged along columns or rows undergoes colorimetry is particularly effective. The color patches P that sequentially undergo colorimetry may be either the columns or the rows. Below, however, the colorimetric apparatus 1 is explained as an apparatus that sequentially performs colorimetry on a plurality of color patches P arranged in columns.

Additionally, the color chart C has a predetermined order for performing colorimetry on the color patches P arranged in each column. The description for the case of n columns in the color chart C in FIG. 2 is colorimetry performed on color patches P (2, n), (3, n), . . . in order from color patch P (1, n) in the first row. However, the order of the colorimetry is not limited to this.

Additionally, the color chart C in FIG. 2 is arranged to repeat in order cyan, magenta, and yellow so that the colors of color patches P in the first row of the columns, namely color patches P (1, 1), (2, 1), (3, 1), . . . are cyan, magenta, yellow, cyan, magenta, yellow, . . . . Here, yellow refers to a color that belongs to the first quadrant on the a*b* plane in L*a*b* color space. Cyan refers to a color that belongs to the third quadrant on the a*b* plane in L*a*b* color space. Magenta refers to a color that belongs to the fourth quadrant on the a*b* plane in L*a*b* color space.

In order to describe the colors assigned to the color patches P, in FIG. 2, either C, M, or Y is assigned to the range of color patches P (1, 1) to (4, 8). C indicates that cyan is assigned. M indicates that magenta is assigned. Y indicates that yellow is assigned. Naturally, the colors are assigned in accordance with the same rules for color patches outside of the range of color patches P (1, 1) to (4, 8).

The arrangement of the color patches P is not limited to the matrix form as in FIG. 2. For example, color patches P having different colors that sequentially undergo colorimetry may be arranged in lines (including straight lines, curved lines, and combinations thereof), and may have the color patch P that should undergo colorimetry next from some color patch P positioned adjacent to the latter color patch P. That is, the color chart C may include one or more color patches P, and the arrangement thereof is not particularly limited. When the color patches are arranged in the columns or the rows of a matrix, a color chart in this kind of arrangement can provide better results to be described later because the mixing rate of color patches on lines that should undergo colorimetry and color patches on lines that should not undergo colorimetry is high.

In addition, spaces that are not colorimetry targets may be provided between adjacent color patches P. Additionally, the shapes of the color patches P may be any shape and are not restricted to rectangles.

Here, rectangles are not limited to only strict rectangles and includes ones that include differences in that numerical values to the extent of being errors.

Color patches in the present invention are equivalent to the color patches P.

Returning to FIG. 1, a colorimetric processing unit 12 includes a colorimetric value acquisition unit 121, a first determination unit 122, a second determination unit 123, an input processing unit 124, and an output processing unit 125. The colorimetric value acquisition unit 121 acquires the colorimetric values from the colorimetric value acquisition unit 111. The first determination unit 122 determines whether or not the color patches P subjected to colorimetry by the colorimetric device 30 are arranged in columns that should undergo colorimetry. The second determination unit 123 determines whether or not one column is undergoing colorimetry. The input processing unit 124 receives input information from the input apparatus 50. The output processing unit 125 outputs the determination result from the first determination unit 122 to the output apparatus 40.

The acquisition step of the present invention is equivalent to the processing performed by the colorimetric value acquisition unit 111 or the colorimetric value acquisition unit 121; and the acquisition unit is equivalent to the colorimetric value acquisition unit 111 or the colorimetric value acquisition unit 121. The first determination step of the present invention is equivalent to the processing performed by the first determination unit 122, and the first determination unit is equivalent to the first determination unit 122. The second determination step of the present invention is equivalent to the processing performed by the second determination unit 123.

Color chart image data 21 and reference values 22 are stored in the memory unit 20. Color chart image data 21 are image data for printing the color chart C. The reference values 22 are the reference values of the color patches P in the color chart C. The formats are not particularly limited, but the reference values 22 include the positions of the color patches P in the color chart C and the colorimetric values (reference values) of the color patches P at those positions. Here, reference values 22 that include the matrix showing the positions of the color patches P and the reference values on the a*b* plane in the L*a*b* color space of the color patches P are explained.

Although not shown, the colorimetric apparatus 1 may also include a configuration provided for an ordinary computer such as a read/write apparatus that reads and writes volatile memory, nonvolatile memory, and portable storage media, and a communication apparatus for connecting to a communications network, which is not shown, and the like.

Figure 3:
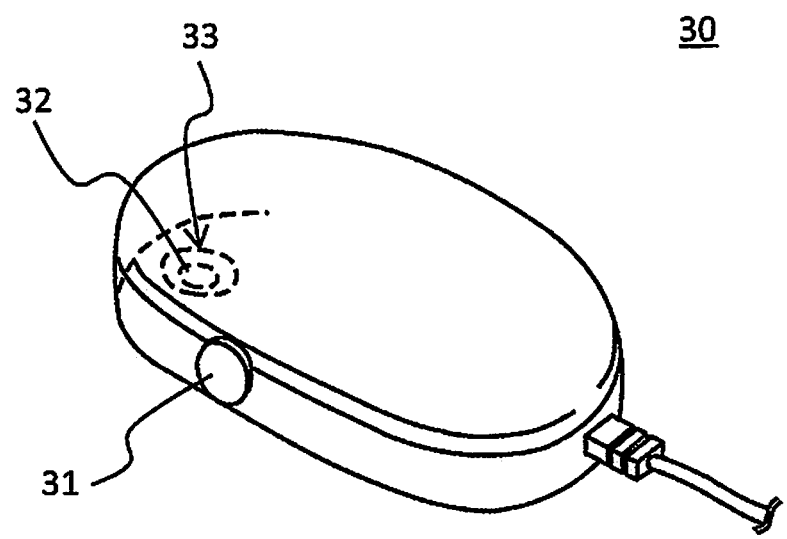
FIG. 3 is a perspective diagram of a colorimetric device.

FIG. 3 is a perspective drawing of the colorimetric device 30. The colorimetric device 30 includes a switch 31, a colorimetric unit 32, and a contact unit 33. The switch 31 is for the user to input the commands to start and stop colorimetry. The colorimetric unit 32 includes a light-emitting unit, a light-receiving unit, and an analog-to-digital (A/D) converter (omitted from the drawings). Light from the light-emitting unit that is reflected by a color patch P is received by the light-receiving unit. The electrical signal corresponding to the amount of received light is digitized by the A/D converter. This digital value is output as the colorimetric value. The contact unit 33 is a convex structure that includes a surface in contact with the color chart C and is configured so that when a guide G is placed on the color chart C, as will be explained later, and the colorimetric device 30 is placed thereon, light from the light-emitting unit of the colorimetric unit 32 irradiates the color chart C, and the light reflected therefrom is received by the light-receiving unit.

In this embodiment, the colorimetric device 30 is explained as a device that acquires the coordinate values on the a*b* plane in L*a*b* color space as the colorimetric values, but is not limited to this.

Additionally, here, contact includes not only strict contact, but there may be gaps that do not affect the colorimetry between the colorimetric unit 32 and the color chart C.

Figure 4:
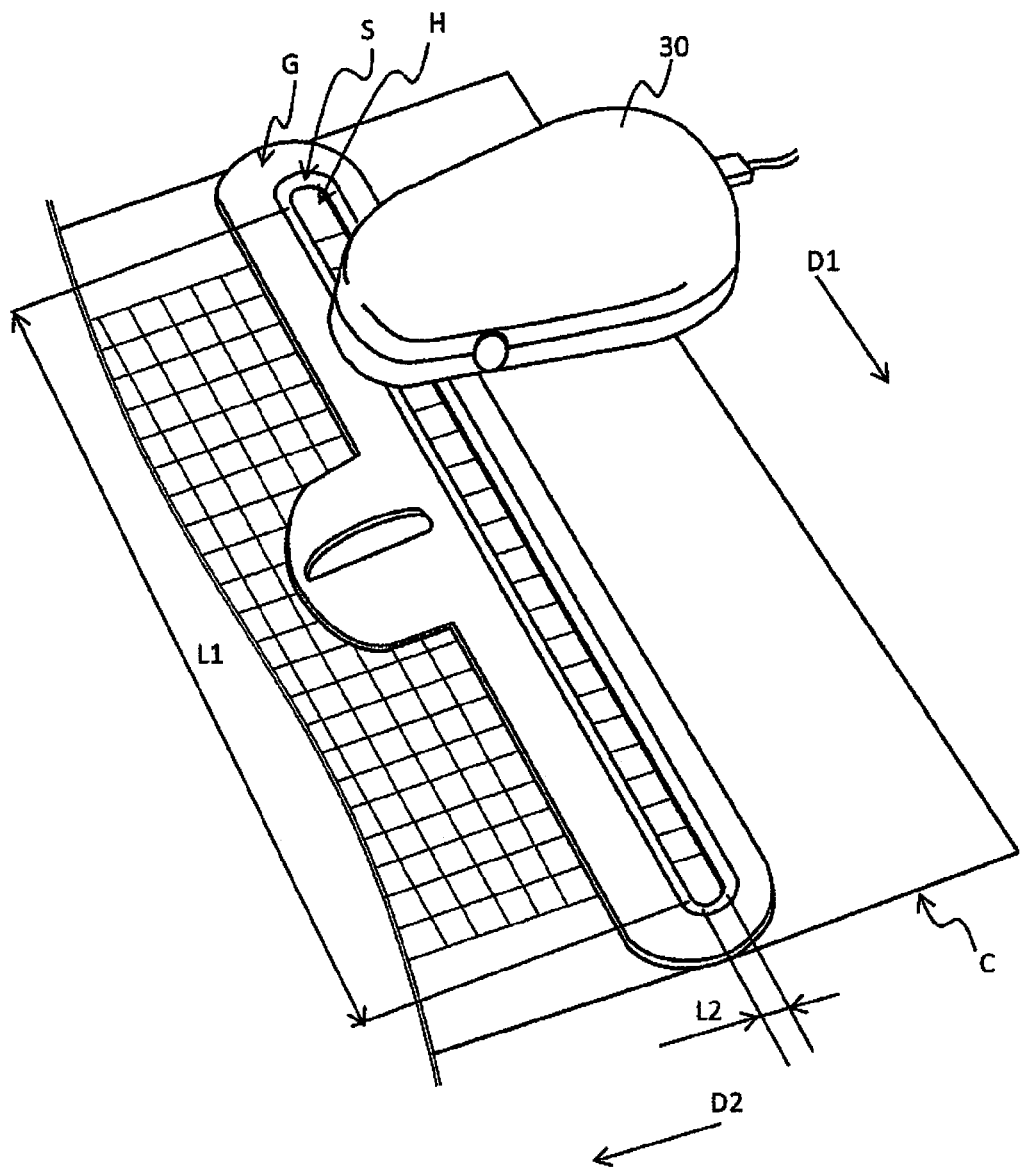
FIG. 4 is a schematic diagram when the colorimetric device is used to measure the color values of color patches P on a color chart C.

FIG. 4 is a schematic diagram of using the colorimetric device 30 to perform colorimetry on the color patches P in the color chart C. In this embodiment, the colorimetry performed on the color patches P in the color chart C is explained when the guide G is used with the colorimetric device 30.

The guide G is provided with a through-hole H and a sliding unit S at the edge of the through-hole H. The through-hole H is provided with the dimension (e.g., length L1 in FIG. 4) in the column direction (direction D1 in FIG. 4) of the color patches P that is longer than the length of all of the color patches P arranged in one column and the dimension (e.g., length L2 in FIG. 4) in the row direction (direction D2 in FIG. 4) of the color patches P that enable the contact unit 33 to pass through through-hole H and is the same length as the length in the direction in the row direction of the color patches P.

Here, the same length is not only the exact same length, but also includes differences in the length to the extent of being errors.

The sliding unit S is a concave structure and through-hole H is the vertex of the concavity. This concave structure is configured to fit the convex structure of the contact unit 33. Due to this, the colorimetric device 30 is slid in the column direction on the guide G and the sliding motion in the row direction of the color patches P of the colorimetric device 30 can be restricted.

During colorimetry, the user places the guide G on the color chart C. The guide G is positioned so that all of the color patches P the column targeted for colorimetry are visible through the through-hole H. The user places the colorimetric device 30 so that the contact unit 33 is in contact with the color patch P in the first row of the column targeted for colorimetry, that is, in contact with color patch P (1, n). Then, the user slides the colorimetric device 30 in the column direction after pressing or while pressing the switch 31 to sequentially measure the colors of the color patches P in all of the rows in one column. Consequently, a plurality of colorimetric values is acquired in one scan.

Figure 5:
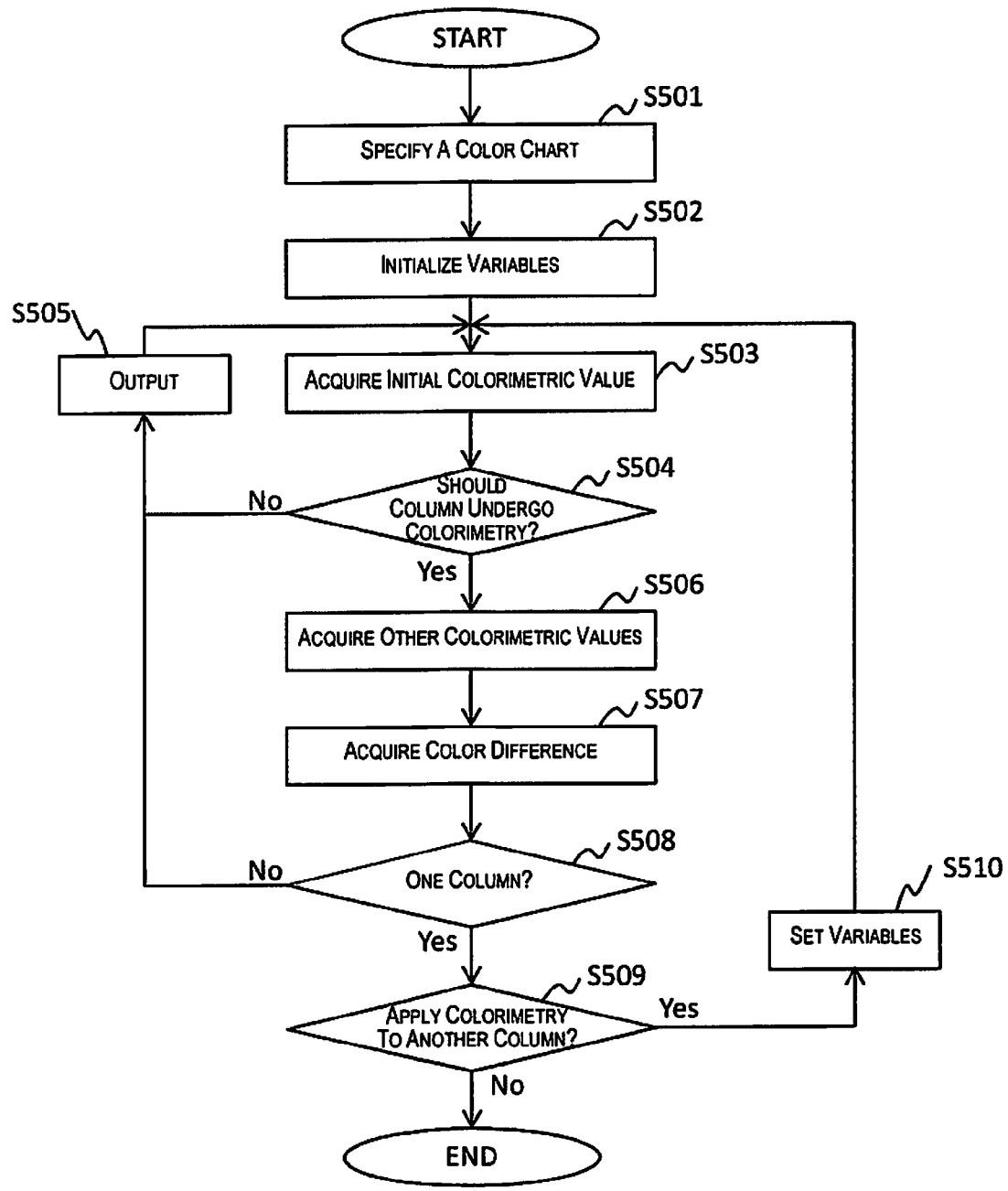
FIG. 5 is an operating example of colorimetry by the colorimetric apparatus.

Next, an operating example of the colorimetric apparatus 1 is explained. FIG. 5 is an operating example of colorimetry by colorimetric apparatus 1. For example, this operation starts when a command is input from the input apparatus 50.

The colorimetric apparatus 1 first specifies the color chart C to undergo colorimetry (S501). This process is not particularly limited. For example, the colorimetric value acquisition unit 121 may output the output information in order to select any one of a plurality of color charts stored in the memory unit 20 as the color chart image data 21 to the output apparatus 40 and specify the color chart C to undergo colorimetry in accordance with the information input from the input apparatus 50. In addition, the colorimetric value acquisition unit 121 may output color chart image data 21 for printing the selected color chart C to the output apparatus 40, which is a printing apparatus, to print the color chart C.

Next, the colorimetric value acquisition unit 121 initializes the variables (S502). When the variable that represents a row in the color chart C is set to M and the variable that represents a column is set to N, then, for example, the colorimetric value acquisition unit 121 sets M=1 and N=1.

Here, the colorimetric value acquisition unit 121 may output information that indicates which column will undergo colorimetry from among the plurality of columns in the color chart C to the output apparatus 40 before or after the process in S502.

Next, the colorimetric value acquisition unit 121 acquires the colorimetric value of the color initially measured (S503). As described above, this colorimetric value is the colorimetric value of the color patch P that initially undergoes colorimetry when the user placed the guide G on the color chart C and pressed the switch 31.

Next, the first determination unit 122 determines whether or not the column on which the colorimetric device 30 will perform colorimetry is the column that should undergo colorimetry from the colorimetric value acquired in S503 (S504). There is believed to be a plurality of technologies that implement the process in S504, and the details thereof will be explained below.

[Technology 1]

The first determination unit 122 plots the colorimetric value acquired in S503 on the a*b* plane, and determines which quadrant the plot point belongs to and the color of the color patch P that initially underwent colorimetry. More specifically, for example, the color of the color patch P is yellow, if the plot point belongs to the first quadrant; the color of the color patch P is cyan, if the point belongs to the third quadrant; and the color of the color patch P is magenta, if the point belongs to the fourth quadrant. The first determination unit 122 sets the decoded value D to zero, if the discriminated color of the color patch P is yellow; sets the decoded value D to 1, if the color of the color patch P is cyan; and sets the decoded value D to 2, if the color of the color patch P is magenta.

Next, the first determination unit 122 calculates the remainder R of variable N (=column) and numerical value "3" by using a function such as, for example, R=MOD(N, 3). When the remainder R and the decoded value D agree, the first determination unit 122 determines that a column that should undergo colorimetry is undergoing colorimetry. On the other hand, when the remainder R and the decoded value D do not agree, the first determination unit 122 determines that an incorrect column is undergoing colorimetry.

This technology is applicable when the colors of the color patches P in the first row of each column of the color chart C repeat in a predetermined order, such as cyan, magenta, yellow. The load on the colorimetric apparatus can be reduced because it is possible to simplify the process for determining whether or not colorimetry should be performed.

This technology is applicable if the colors of the color patches P in the first row of each column in the color chart C, as described above, repeat in a predetermined order. The repeated colors are any colors and are not restricted to cyan, magenta, and yellow; the order is not limited to this order either. In other words, it is applicable, for example, when the colors of the color patches P belong to any of x types (where x is 2 or a larger integer) in accordance with any standards or rules, such as the first quadrant, the third quadrant, and the fourth quadrant on the a*b* plane in L*a*b* color space; and the colors of the color patches P in the first row of the color chart C repeat in a predetermined order. In this case, the value of the decoded value D is determined from whether or not the remainder R of variable M and numerical value "x" agrees with the decoded D so that the value differs with the repetition order.

As a specific example, the case is explained in which the colors of the color patches P belong to either class x1 or class x2, and the colors of the color patches P in the first row in the color chart C repeat as x1, x2, x1, x2 . . . . In this case, the first determination unit 122 sets the decoded value to 1, if the discriminated color of the color patch P is x1; and sets the decoded value to zero, if the discriminated color of the color patch P is x2. The first determination unit 122 calculates the remainder R of the variable M and the numerical value "2," and determines whether or not a column that should undergo colorimetry is undergoing colorimetry as described above from this remainder R.

In the above, the colorimetric value is classified depending on whether the value belongs to any one of the first quadrant, the third quadrant, and the fourth quadrant in the a*b* plane in the L*a*b* color space, but is not limited to this. As described above, the classification can be made in accordance with any standards or rules. For example, which class the colorimetric value belongs to may be determined by determining to which range from among a plurality of ranges the value belongs even for only the first quadrant in the a*b* plane in the L*a*b* color space.

[Technology 2]

The first determination unit 122 determines whether or not the column that will undergo colorimetry by the 30 should undergo colorimetry from whether or not the color difference between the colorimetric value acquired in S503 and the reference value corresponding to the color patch P that should initially undergo colorimetry is within a predetermined range for a plurality of color patches P in one column. More specifically, the first determination unit 122, for example, specifies the reference value of the color patch P that should initially undergo colorimetry from among the reference values 22, and determines whether or not the color difference ΔE between the colorimetric value acquired in S503 and the specified reference value is within a predetermined range (e.g., within 3). When the result of this determination is within the predetermined range, the first determination unit 122 determines that a column that should undergo colorimetry is undergoing colorimetry. On the other hand, when the result of this determination is that the value is not within the predetermined range, the first determination unit 122 determines that a column that should undergo colorimetry is not undergoing colorimetry.

How to implement the determination in both Technology 1 and Technology 2 described above can be freely decided. However, both Technology 1 and Technology 2 described above compared the colorimetric value acquired after colorimetry to the reference value of the color patch subjected to colorimetry, and shared the point of determining whether or not a column that should undergo colorimetry is undergoing colorimetry from whether or not the difference between the colorimetric value and the reference value is within a predetermined range.

Figure 6:
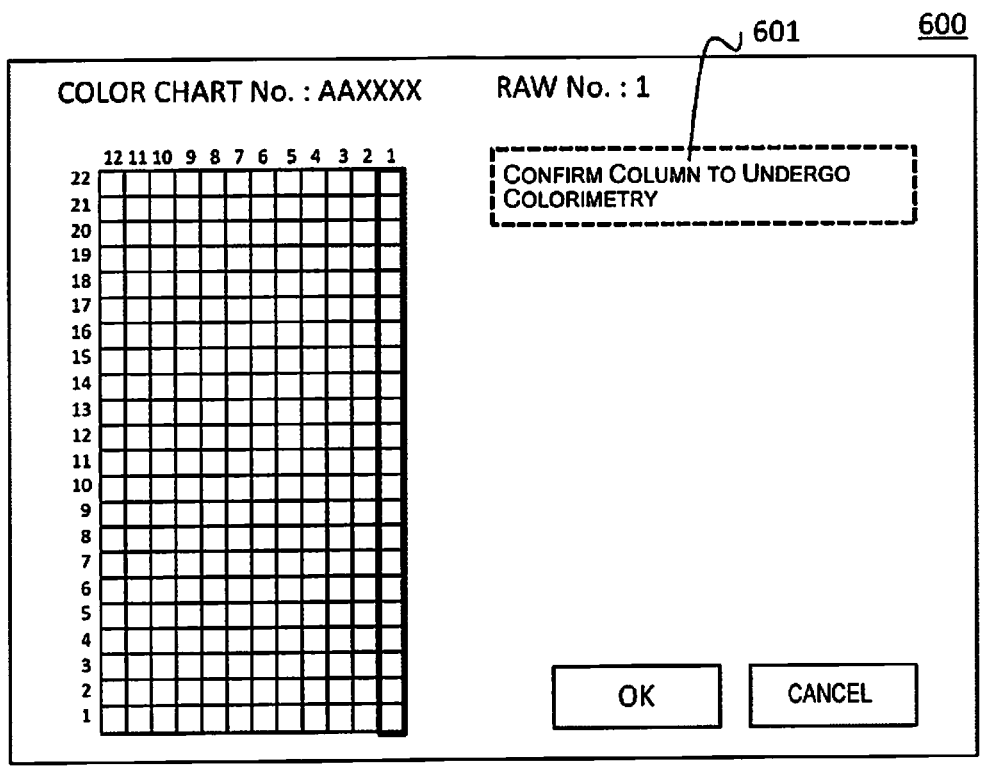
FIG. 6 is an example of a screen of information that notifies that the column that will undergo colorimetry is not a column that should undergo colorimetry and is output to a display apparatus.

When the result of the determination in S504 determined that the column to undergo colorimetry is not a column that should undergo colorimetry (S504: No), the output processing unit 125 outputs information that notifies that the column to undergo colorimetry is not a column that should undergo colorimetry to the output apparatus 40 (S505). FIG. 6 is an example of the screen of the information notifying that the column to undergo colorimetry is not a column that should undergo colorimetry that is output to the display apparatus. A screen 600 includes a region 601 for displaying that the column to undergo colorimetry is not a column that should undergo colorimetry. The output processing unit 125 may perform display processing for notification of a column that should undergo colorimetry (e.g., blinking or changing color, and the like).

Returning to FIG. 5, when the result of the determination in S504 determined that the column to undergo colorimetry is a column that should undergo colorimetry (S504: Yes), the colorimetric value acquisition unit 121 acquires other colorimetric values input subsequently (colorimetric values of color patches P (2, N), (3, N), (4, N) . . . ) (S506). Next, the second determination unit 123 acquires the color difference ΔE between each colorimetric value and the reference value corresponding to the position of the color patch P that obtained that colorimetric value (S507).

The second determination unit 123 determines whether or not the obtained colorimetric values were obtained from one column undergoing colorimetry from the obtained color differences ΔE (S508). Therefore, the second determination unit 123 determines that the colorimetric values were obtained when one column had undergone colorimetry when the color difference ΔE between each colorimetric value and the reference value corresponding to the position of the color patch P that obtained the colorimetric value is within a predetermined range (e.g., within 3), and the colorimetric values were not obtained when one column had undergone colorimetry when the color difference ΔE is not within a predetermined range. Namely, the second determination unit 123 determines whether or not one column is undergoing colorimetry from whether or not the colorimetric values are within a predetermined range with respect to the reference values 22. The acquisition of the color difference and the determination in S507 and S508 may be performed for all of the colorimetric values acquired in one scan, or may be performed for a portion of the colorimetric values.

Figure 7:
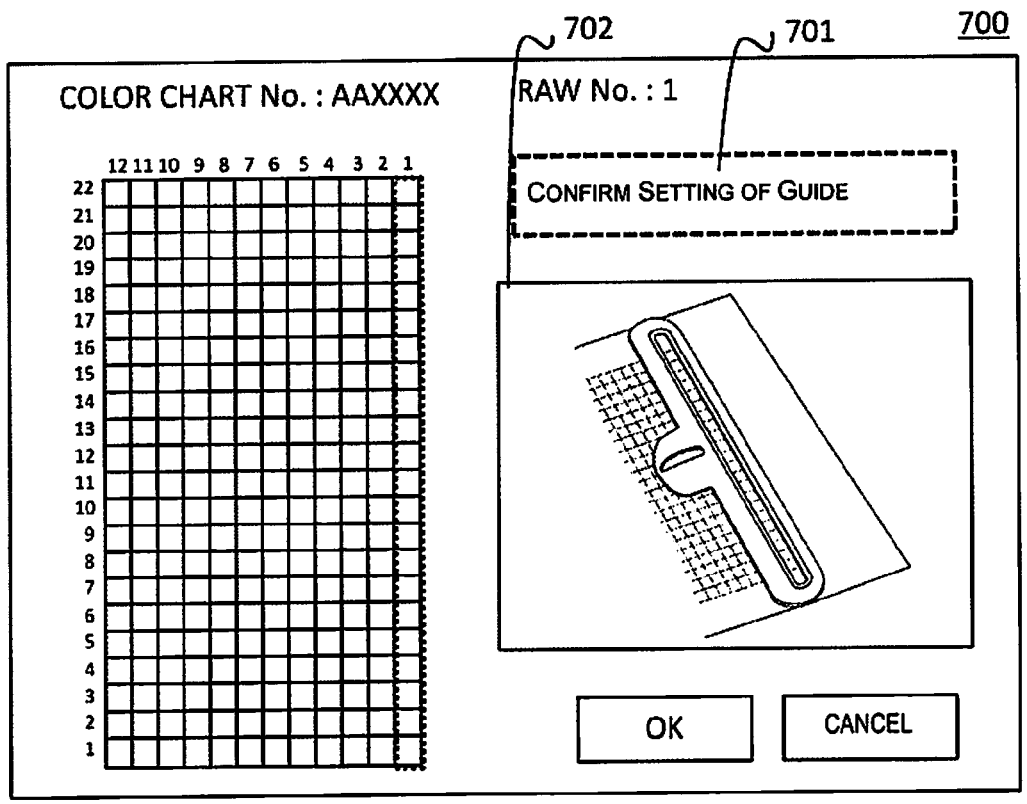
FIG. 7 is an example of a screen output to a display apparatus of information notifying that one column is not undergoing colorimetry.

When the result of the determination in S508 determines that the colorimetric values were not obtained by one column having undergone colorimetry (S508: No), the output processing unit 125 outputs information notifying that one column is not undergoing colorimetry to the output apparatus 40 (S505). FIG. 7 is an example of a screen of the information notifying that one column is not undergoing colorimetry that is output to the display apparatus. A screen 700 includes a region 701 for displaying that one column is not undergoing colorimetry. This time, the output processing unit 125 may also include an image showing the correct placement of the guide G (e.g., region 702) on the screen 700.

In this embodiment, as described above, when the guide G is placed on the color chart C, and colorimetry is performed by the colorimetric device 30 through the through-hole H in the guide G, sometimes the longer direction of the through-hole H is not parallel to the column arranged with color patches P, or crosses over two column even when parallel. When colorimetry is performed while this kind of positioning error of the guide G is maintained, incorrect colorimetric values are obtained. Alternatively, the main causes are errors in the transport mechanism of the printing apparatus that prints the color chart C or the printing media, and sometimes the guide G cannot be correctly placed. Even in this case, one column not undergoing colorimetry can be detected by performing the processes in S507 and S508.

Returning to FIG. 5, when the result of the determination in S508 determines that the colorimetric values were obtained by one column having undergone colorimetry (S508: Yes), the colorimetric value acquisition unit 121 determines whether or not another column will undergo colorimetry (S509). This determination may be determined by, for example, a colorimetry mode, or may be determined from the column (value of variable N) that is undergoing colorimetry.

When the result of the determination of S509 is that another column will undergo colorimetry (S509: Yes), the colorimetric value acquisition unit 121, for example, sets variables M and N, such as M=1 and N=N+1 (S510), and returns to the process in S503. When the result of the determination of S509 is that another column will not undergo colorimetry (S509: No), the colorimetric value acquisition unit 121 terminates the process.

At least once before or after S509, the colorimetric values are analyzed. For example, processing, such as calculation of corrective values or profile generation, may be carried out by an ordinary colorimetric apparatus.

Above, a colorimetry operation was described, but there is no limitation to the above description. For example, in the above description, the output of S505 is carried out immediately after the determination in S504 that the column that should undergo colorimetry is not undergoing colorimetry, but the output of S505 immediately after the determination is not necessary. For example, the output may be carried out with the determination result of S508. However, in order to avoid unnecessary operations, preferably, the output of S505 is carried out immediately after the determination in S504 that the column that should undergo colorimetry is not undergoing colorimetry.

In addition, the colorimetric value and the reference value of the color patch P that initially underwent colorimetry were compared in order to determine whether or not the column that underwent colorimetry by the colorimetric device 30 is a column that should have undergone colorimetry, but this comparison is not limited to the colorimetric value of the color patch P that initially underwent colorimetry. The comparison with the reference value can be any one of the colorimetric values of all of the color patches P acquired in one scan. However, in order to avoid unnecessary operations, comparison with the color patch P that initially underwent colorimetry is preferred.

Additionally, in the above description, the guide G was placed on the color chart C, and the colorimetric device 30 was slid and performed colorimetry, but the guide G does not necessarily have to be used. In addition, even if the guide G is used, the structure of the guide G is not limited to the one described above.

An example in which the colorimetric processing unit and the driver were provided separately was explained in the above description, but the structure is not limited to this. The colorimetric processing unit and the driver may be one structure. Namely, the colorimetric processing unit may directly acquire the colorimetric values from the colorimetric device.

Additionally, the colorimetric device was a hand scanner that is operated manually by a user, but the colorimetry process described above can be applied even when the colorimetric device is operated automatically. This type of automatically controlled colorimetric device, which is not shown, is provided, for example, in the printing apparatus. Due to this, colorimetry errors caused by errors in the transport mechanism of the automatically controlled colorimetric device, errors in the transport mechanism of the media, errors in the media, errors in the printing nozzle, and the like can be detected.

The present invention was explained above with reference to embodiments, but the technical field of the present invention is not limited to the scope described in the above embodiments. Clearly, a person skilled in the art can add various modifications or improvements to the above embodiments. Additionally, embodiments with these modifications or improvements are also included in the technical scope of the present invention and are clearly described in the scope of the patent claims. In particular, the present invention may be provided as a colorimetric system that separately provides a colorimetric device and a control unit; a colorimetric apparatus that includes a colorimetric device, a control unit, and the like; only a control unit; or a colorimetric apparatus that includes a control unit. In addition, the present invention can also be provided as programs for controlling a computer, or the like, and storage media for storing programs.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A colorimetric method comprising:
   performing colorimetry on color patches to acquire colorimetric values; and
   determining whether or not the color patches that have been subjected to the colorimetry are target color patches that should undergo the colorimetry based on the colorimetric values and reference values,
   the color patches being arranged in a matrix form,
   the colorimetric values being acquired by measuring color values of the color patches along the rows or the columns of the matrix,
   a plurality of different colors being assigned in a predetermined order to the color patches arranged along the rows or the columns of the matrix, and
   the determining further including determining a decoded value based on one of the colorimetric values in response to measuring a color value of one of the color patches, and determining whether or not the color patches that have been subjected to the colorimetry are the target color patches that should undergo the colorimetry based on whether or not the remainder of a row number or a column number of the color patches that have been subjected to the colorimetry relative to a number of the different colors matches the decoded value.

2. The colorimetric method according to claim 1, wherein the determining further includes determining whether or not the color patches that have been subjected to the colorimetry are the target color patches that should undergo the colorimetry based on whether or not the quadrants in the a*b* plane in the L*a*b* color space to which the colorimetric values belong are the same as the quadrants in the a*b* plane in the L*a*b* color space to which the reference values belong.

3. The colorimetric method according to claim 2, wherein the different colors belonging to the first quadrant, the third quadrant, or the fourth quadrant are assigned in the predetermined order to the color patches arranged along the rows or the columns of the matrix, and
   the determining further includes determining the decoded value based on which of the first quadrant, the third quadrant, and the fourth quadrant a colorimetric value belongs to, and determining whether or not the color patches that have been subjected to the colorimetry are the target color patches that should undergo the colorimetry based on whether or not the remainder of a row number or a column number of the color patches that have been subjected to the colorimetry relative to a numerical value 3 matches the decoded value.

4. The colorimetric method according to claim 1, wherein a plurality of color patches is arranged on a line, and further comprising
   determining whether or not the color patches that have been subjected to the colorimetry are arranged on one line based on whether or not each of the colorimetric values of the plurality of color patches is within a predetermined range with respect to the reference values.

5. The colorimetric method according to claim 1, wherein the determining further includes determining whether or not the color patches that have been subjected to the colorimetry are the target color patches that should undergo the colorimetry based on a colorimetric value of the initial colorimetry and a reference value of a color patch.

6. A colorimetric apparatus comprising:
   a processor that performs colorimetry on color patches to acquire colorimetric values; and determines whether or not the color patches that have been subjected to the colorimetry are target color patches that should undergo the colorimetry based on the colorimetric values and reference values,
   the color patches being arranged in a matrix form,
   the colorimetric values being acquired by measuring color values of the color patches along the rows or the columns of the matrix,
   a plurality of different colors being assigned in a predetermined order to the color patches arranged along the rows or the columns of the matrix, and
   the processor further determining a decoded value based on one of the colorimetric values in response to measuring a color value of one of the color patches, and determining whether or not the color patches that have been subjected to the colorimetry are the target color patches that should undergo the colorimetry based on whether or not the remainder of a row number or a column number of the color patches that have been subjected to the colorimetry relative to a number of the different colors matches the decoded value.

7. A printing apparatus comprising:
   a colorimetric apparatus including a processor that performs colorimetry on color patches to acquire colorimetric values, and determines whether or not the color patches that have been subjected to the colorimetry are target color patches that should undergo the colorimetry based on the colorimetric values and reference values,
   the color patches being arranged in a matrix form,
   the colorimetric values being acquired by measuring color values of the color patches along the rows or the columns of the matrix,
   a plurality of different colors being assigned in a predetermined order to the color patches arranged along the rows or the columns of the matrix, and
   the processor further determining a decoded value based on one of the colorimetric values in response to measuring a color value of one of the color patches, and determining whether or not the color patches that have been subjected to the colorimetry are the target color patches that should undergo the colorimetry based on whether or not the remainder of a row number or a column number of the color patches that have been subjected to the colorimetry relative to a number of the different colors matches the decoded value.

* * * * *